(12) United States Patent
Hashimoto et al.

(10) Patent No.: US 7,817,847 B2
(45) Date of Patent: Oct. 19, 2010

(54) ROBOT SYSTEM WITH VISION SENSOR

(75) Inventors: Yoshiki Hashimoto, Hadano (JP); Minoru Enomoto, Yamanashi (JP)

(73) Assignee: Fanuc Ltd, Minamitsuru-gun, Yamanashi (JP)

( * ) Notice: Subject to any disclaimer, the term of this patent is extended or adjusted under 35 U.S.C. 154(b) by 1201 days.

(21) Appl. No.: 11/242,934

(22) Filed: Oct. 5, 2005

(65) Prior Publication Data

US 2006/0072809 A1    Apr. 6, 2006

(30) Foreign Application Priority Data

Oct. 5, 2004    (JP)    ................ 2004-292829

(51) Int. Cl.
*G06K 9/00*    (2006.01)
(52) U.S. Cl. .................. 382/153; 382/141; 382/142; 382/143; 382/144; 382/145; 382/146; 382/147; 382/148; 382/149; 382/150; 382/151; 382/152; 700/259
(58) Field of Classification Search ......... 382/141–153; 700/259
See application file for complete search history.

(56) References Cited

U.S. PATENT DOCUMENTS

| | | | | |
|---|---|---|---|---|
| 4,789,940 A | * | 12/1988 | Christian | .............. 700/113 |
| 5,204,942 A | * | 4/1993 | Otera et al. | ............... 700/248 |
| 5,586,387 A | * | 12/1996 | Nakatani et al. | .............. 29/703 |
| 6,278,906 B1 | * | 8/2001 | Piepmeier et al. | ........... 700/258 |
| 6,681,151 B1 | | 1/2004 | Weinzimmer et al. | |
| 2003/0078694 A1 | * | 4/2003 | Watanabe et al. | ........... 700/245 |

FOREIGN PATENT DOCUMENTS

| EP | 1324268 A2 | * | 7/2003 |
|---|---|---|---|
| GR | 2003-148914 | | 5/2003 |

OTHER PUBLICATIONS

Chinese First Office Action dated Jun. 29, 2007 issued in Chinese Patent Application No. 2005101082565.
A Japanese Notice of Reasons for Rejection mailed Sep. 11, 2007 in JP Application No. 2004-292829 (including a partial translation thereof).

* cited by examiner

*Primary Examiner*—Vikkram Bali
*Assistant Examiner*—Daniel Zeilberger
(74) *Attorney, Agent, or Firm*—Drinker Biddle & Reath LLP (57) ABSTRACT

A robot system having a vision sensor. The robot system includes a robot; a robot controlling section for controlling an operation of the robot; an imaging section provided on the robot and obtaining image data of a working environment of the robot; an image processing section for processing the image data obtained in the imaging section; a vision controlling section for controlling the imaging section and the image processing section to cause execution of obtaining the image data, transmitting the image data thus obtained, and processing the image data; and a communication network to which the robot controlling section, the image processing section and the vision controlling section are connected.

7 Claims, 4 Drawing Sheets

ROBOT SYSTEM WITH VISION SENSOR

BACKGROUND OF THE INVENTION

1. Field of the Invention

The present invention relates to a robot system having a vision sensor.

2. Description of the Related Art

When applying a robot work (or task) program, prepared by an off-line teaching based on a simulation, to an actual robot, actual relative positions between the robot and objects (e.g., various peripheral equipment) present in the working environment of the robot may include errors with respect to relative positions between the corresponding models in the off-line teaching. Further, when moving an actually used robot system in position of installation, errors may arise in the relative positions between the robot and peripheral equipment during a period between before and after movement. In order to measure these errors in relative positions to, e.g., correct taught data, it is known to use a robot system having a vision sensor (also called as a "robot vision").

In a conventional position error measurement system using a robot vision, in general, one vision-sensor set (i.e., an imaging (or image pick-up) camera and an image processing unit) is provided for one set of a robot and robot control unit. The imaging camera of the vision sensor is attached to the arm of the robot or to a work tool (i.e., an end effector) supported at the front end of the arm, and, in a state where the robot is kept stationary at desired position and orientation under the control of the robot control unit, operates to photograph an object to be measured, present in the working environment, so as to obtain image data. The image processing unit of the vision sensor connected to the robot control unit processes the image data obtained by the imaging camera, so that three-dimensional relative position and orientation between the robot and object to be measured (hereinafter referred to as a "3D relative position/orientation") is measured.

In the above-described conventional position error measurement system, when it is desired to use a single image processing unit in common for a plurality of robots, it is necessary that, after finishing the required measurements relating to one robot, the imaging camera and the image processing unit are detached from the robot and the corresponding robot control unit, and are reconnected to another robot and another robot control unit, which should be measured subsequently. Such a reattaching work of the camera and image processing unit in association with a plurality of robots and robot control units is likely to spend time and thus to degrade working efficiency. Further, the imaging camera is generally connected through a signal cable to the image processing unit, so that the handling (e.g., detaching and connecting) of the signal cable also tends to take labor.

SUMMARY OF THE INVENTION

It is an object of the present invention to provide a robot system having an external measuring function using a vision sensor, which is capable of quickly performing an external measuring in association with a plurality of robots, with labor spent mainly on the reattaching work of the vision sensor being lightened, and thereby capable of efficiently measuring errors in 3D relative position/orientation between individual robots and peripheral objects, so as to permit previously taught position/orientation data to be accurately corrected.

To accomplish the above object, the present invention provides a robot system comprising a robot; a robot controlling section for controlling an operation of the robot; an imaging section provided on the robot and obtaining image data of a working environment of the robot; an image processing section for processing the image data obtained in the imaging section; a vision controlling section for controlling the imaging section and the image processing section to cause execution of obtaining the image data, transmitting the image data thus obtained, and processing the image data; and a communication network to which the robot controlling section, the image processing section and the vision controlling section are connected.

In the above robot system, the robot controlling section, the image processing section and the vision controlling section may be incorporated into a common robot control unit, the imaging section may be connected to the image processing section through the communication network, and the vision controlling section may cause a transmission of the image data obtained in the imaging section through the communication network to the image processing section.

In the above configuration, the robot system may further comprise a data transmitting section provided in the imaging section and a data receiving section connected through the communication network to the image processing section. In this arrangement, the vision controlling section causes the transmission of the image data from the data transmitting section to the data receiving section in a form of a radio transmission as well as from the data receiving section through the communication network to the image processing section.

Alternatively, a configuration may be adopted wherein the robot controlling section and the vision controlling section are incorporated into a common robot control unit, and wherein the vision controlling section is connected to the image processing section through the communication network.

In the above configuration, the robot system may further comprise a data transmitting section provided in the imaging section and a data receiving section connected through a signal line to the image processing section. In this arrangement, the vision controlling section causes a transmission of the image data from the data transmitting section to the data receiving section in a form of a radio transmission as well as from the data receiving section through the signal line to the image processing section.

The above robot system may further comprise a manual operating section connected to the robot controlling section. In this arrangement, by an operation for the manual operating section, the robot controlling section controls the operation of the robot, and the vision controlling section controls the imaging section and the image processing section through the robot controlling section.

In the above configuration, the manual operating section may be provided with a display section, and the vision controlling section may make the display section display, as an image, the image data obtained in the imaging section, by an operation for the manual operating section.

Further, the vision controlling section may make the imaging section obtain the image data at predetermined time intervals and make the display section display, as a moving image, the image data thus obtained.

The above robot system may comprise a plurality of robots and a plurality of robot control units provided to individually correspond to the plurality of robots. In this arrangement, each of the plurality of robot control units includes the robot controlling section, the imaging section is detachably attached to a desired robot selected from the plurality of robots, and the plurality of robot control units are connected to the communication network.

The present invention also provides a robot control unit incorporated into a robot system as described above, which comprises the robot controlling section for controlling the operation of the robot in accordance with a work program; and a command value correcting section for correcting a position-related command value included in the work program, based on robot-position related data obtained as a result of processing of the image data in the image processing section.

BRIEF DESCRIPTION OF THE DRAWINGS

The above and other objects, features and advantages of the present invention will become more apparent from the following description of preferred embodiments in connection with the accompanying drawings, wherein.

DETAILED DESCRIPTION

The embodiments of the present invention are described below in detail, with reference to the accompanying drawings. In the drawings, the same or similar components are denoted by common reference numerals.

Figure 1:
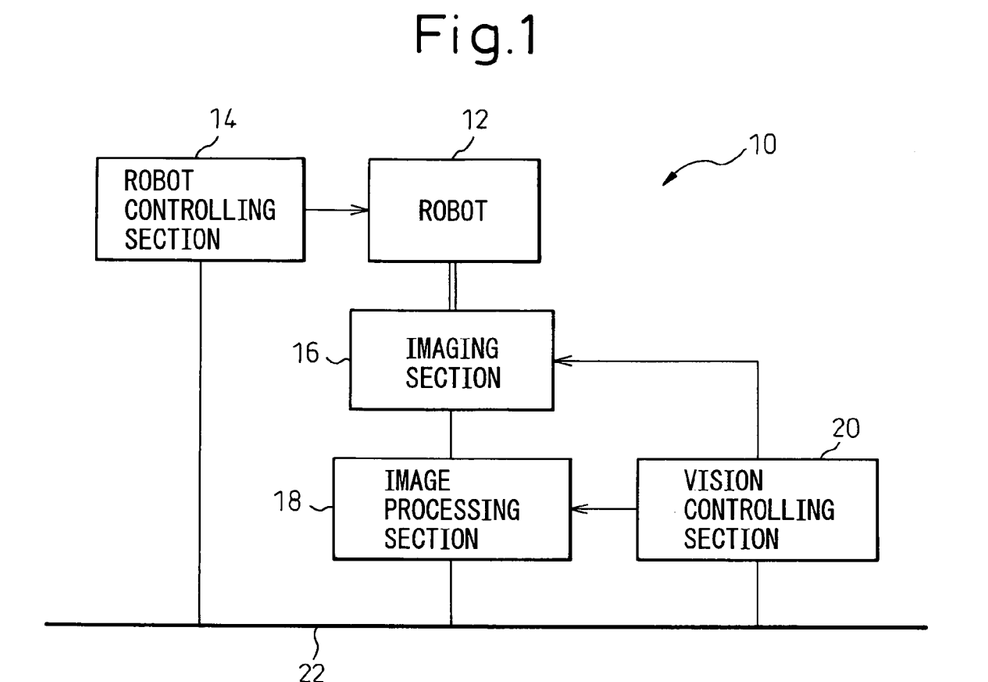
FIG. 1 is a functional block diagram showing the basic configuration of a robot system according to the present invention.

Referring to the drawings, FIG. 1 shows the basic configuration of a robot system 10 according to the present invention. The robot system 10 is provided with a robot 12; a robot controlling section 14 for controlling the operation of the robot 12; an imaging (or image pick-up) section 16 provided on the robot 12 and obtaining image data of the working environment of the robot 12; an image processing section 18 for processing the image data obtained in the imaging section 16; a vision controlling section 20 for controlling the imaging section 16 and the image processing section 18 to cause execution of obtaining the image data, transmitting the image data thus obtained, and processing the image data; and a communication network 22 to which the robot controlling section 14, the image processing section 18 and the vision controlling section 20 are connected. In the robot system 10, the imaging section 16, image processing section 18 and vision controlling section 20 exhibit an external measuring function using a vision sensor, and measure the 3D relative position/orientation between the robot 12 and a peripheral object.

Figure 2:
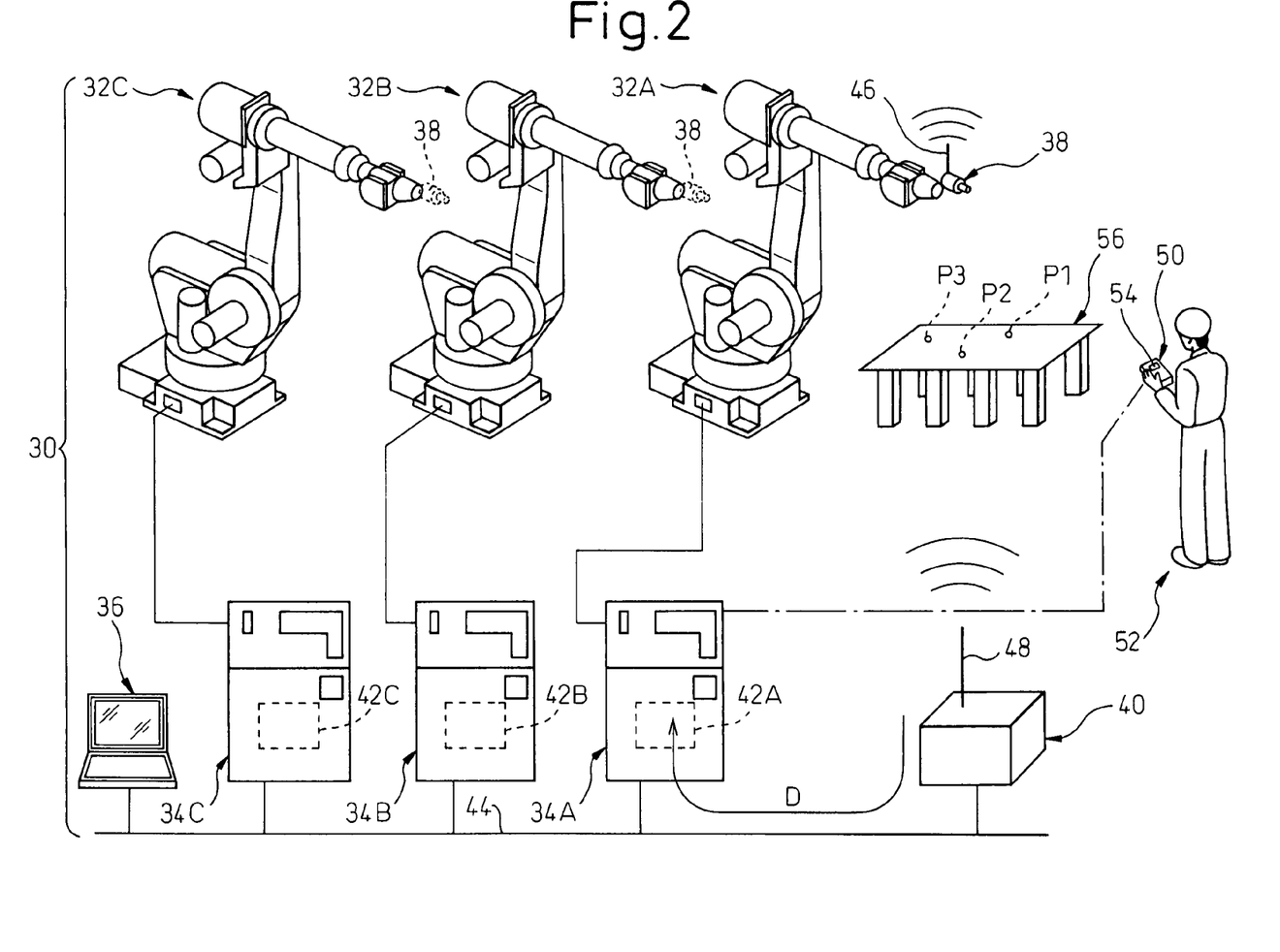
FIG. 2 is a schematic view showing a robot system according to a first embodiment of the present invention.

FIG. 2 shows the overall configuration of a robot system 30 according to a first embodiment of the present invention. The robot system 30 is provided with the basic configuration of the robot system 10 shown in FIG. 1.

As illustrated, the robot system 30 is provided with a plurality of (three, in the drawing) robots (or actual robot mechanical sections) 32A, 32B, 32C; a plurality of robot control units 34A, 34B, 34C provided individually corresponding to the robots 32A to 32C and controlling the operations of the individual robots 32A to 32C; and a robot simulator 36 for preparing the work programs of the robots 32A to 32C in an off-line manner and executing simulations. Further, the robot system 30 is provided with, as components of an external measuring system using a vision sensor, an imaging section (or camera) 38, a transceiver 40, and a plurality of image processing sections 42A, 42B, 42C.

Each of the robot control units 34A to 34C includes a robot controlling section 14 (FIG. 1), a corresponding one of the image processing sections 42A to 42C, and a vision controlling section 20 (FIG. 1), which are incorporated into a common robot control unit. The robot control units 34A to 34C are individually connected to a communication network 44 and are connected through the communication network 44 to the robot simulator 36 and the transceiver 40. The robot controlling section 14 (FIG. 1), each of the image processing sections 42A to 42C and the vision controlling section 20 (FIG. 1) can be constituted by a central processing unit (CPU) of each of the robot control units 34A to 34C.

The imaging section (or camera) 38 is detachably attached to an arm, or a work tool (i.e., an end effector) supported at the front end of the arm, of the desired robot (the robot 32A, in the drawing) selected from the robots 32A to 32C. In this state, the imaging section 38 is connected through the communication network 44 to the corresponding one of the image processing sections 42A to 42C of the robot control units 34A to 34C to enable a data communication. The vision controlling section 20 (FIG. 1) of each of the robot control units 34A to 34C causes a transmission of the image data D, obtained in the imaging section 38, through the communication network 44 to the corresponding one of the image processing sections 42A to 42C.

The imaging section (or camera) 38 is provided with a data transmitting section and a data receiving section (a transmission/reception antenna 46 is illustrated). On the other hand, the transceiver 40 functions as a data transmitting and receiving section connected to the communication network 44 (a transmission/reception antenna 48 is illustrated). Therefore, the imaging section (or camera) 38 and the transceiver 40 can transmit signals to each other by a wireless or radio transmission system. The vision controlling section 20 (FIG. 1) of each robot control unit 34A to 34C causes the transmission of the image data D from the data transmitting section of the imaging section 38 to the transceiver (or the data receiving section) 40 in a form of a radio transmission as well as from the transceiver 40 through the communication network 44 to the corresponding one of the image processing sections 42A to 42C.

The robot system 30 is further provided with a portable-type manual operating section 50 able to be used in common for the plurality of robot control units 34A to 34C. The manual operating section 50 is connected to the robot controlling section 14 (FIG. 1) of the selected one of the robot control units 34A to 34C (the robot control unit 34A, in the drawing). When the operator 52 operates the manual operating section 50, operation commands are given to the robot control unit (the robot control unit 34A, in the drawing) connected to the manual operating section 50, and thus the robot controlling section 14 (FIG. 1) controls the operation of the corresponding robot (the robot 32A, in the drawing). Further, when operating the manual operating section 50, commands, for making the corresponding imaging section 38 and image processing section (the image processing section 42A, in the drawing) perform an image pick-up operation and a subsequent image-data transmission, are given to the robot control unit (the robot control unit 34A, in the drawing) connected to the manual operating section 50, and, through the robot controlling section 14, the vision controlling section 20 (FIG. 1) controls the imaging section 38 and the image processing section 42A.

The manual operating section 50 is provided with a display section 54 comprised of an LCD, etc. When the operator 52 operates the manual operating section 50, a vision controlling section 20 (FIG. 1) can make the display section 54 display, as an image, the image data D obtained in the imaging section (or camera) 38. Further, the vision controlling section 20 can make the imaging section 38 obtain the image data D at predetermined periods or time-intervals and makes the display section 54 display, as a moving image, the image data D thus obtained. This configuration facilitates monitoring of the robot and the working environment.

Near the robots 32A to 32C are peripheral equipment and the other objects to be measured. In the robot system 30, the 3D relative position/orientation between each object to be measured and the corresponding one of the robots 32A to 32C is measured by the external measuring function. FIG. 2 shows only an object 56 to be measured in association with the robot 32A, and the illustration of the other objects to be measured in association with the robots 32B and 32C is omitted. The measured objects in association with the robots 32B, 32C typically differ from the measured objects in association with the robot 32A, but they may also be the same.

In the robot system 30, when measuring the 3D relative position/orientation in connection with the respective robots 32A to 32C and the corresponding objects to be measured, only one imaging section (or camera) 38 is used to execute an image capturing operation. Therefore, each time the combination of robot and object to be measured changes, the imaging section (or camera) 38 is detached from and reattached to any one of the robots 32A to 32C.

For example, in a case where the 3D relative position/orientation is measured for firstly the robot 32A, secondly the robot 32B and lastly the robot 32C, with respect to the corresponding objects to be measured, the imaging section (or camera) 38 is first attached to the arm end of the robot 32A, as illustrated, and during this state, the 3D relative position/orientation between the robot 32A and the object 56 are measured. After the measuring of the set of robot 32A and object 56 is finished, the imaging section (or camera) 38 is detached from the robot 32A and attached to the arm of the next robot 32B (shown by a broken line). Next, after the set of robot 32B and corresponding object (not shown) finishes being measured, the imaging section (or camera) 38 is detached from the robot 32B and attached to the arm of the next robot 32C (shown by a broken line). Further, after the set of robot 32C and corresponding measured object (not shown) finishes being measured, the imaging section (or camera) 38 may be detached from the robot 32C as occasion demands.

In the robot system 30 having the above configuration, the single imaging section (or camera) 38 is successively attached to the robots 32A to 32C for use, while the image processing sections 42A to 42C are incorporated respectively into the robot control units 34A to 34C. Further, signals are transmitted between the imaging section (or camera) 38 and each of the image processing sections 42A to 42C through the communication network 44 to which the robot control units 34A to 34C are connected. Therefore, the reattaching work of the image processing unit (i.e., a cable detaching and attaching work) required in the prior art becomes unnecessary. Further, the operation control signals and image data signals of the imaging section (or camera) 38 are transmitted by the wireless or radio transmission system through the transceiver 40, so that a cable detaching and attaching work accompanying the reattachment of the imaging section (or camera) 38 also becomes unnecessary.

The measurement results of the 3D relative position/orientation between the respective robots 32A to 32C and the corresponding objects to be measured (e.g., the robot 32A and the object 56) obtained through the above procedure are, for example, stored in the memories of the corresponding robot control units 34A to 34C. The stored measurement data of the 3D relative position/orientation can be used for correcting taught point data in a robot program for an operation with respect to the same object. For example, when the robot system 30, actually used, is displaced to another location, the amount of correction of the taught points, which is required for execution of the same robot work after displacement as the robot work before displacement, is determined in the form of a homogeneous transformation matrix, on the basis of the 3D relative position/orientation data measured before displacement and the 3D relative position/orientation data measured after displacement. Further, the measurement data of the 3D relative position/orientation between the robots 32A to 32C and the measured objects can also be used for correction of off-line data, when the off-line data prepared by the robot simulator 36 (in other words, data of a work cell including the respective robots 32A to 32C and the corresponding objects as well as taught data for an off-line program prepared assuming the work cell) are applied to the actual robots 32A to 32C.

The procedure of using a vision sensor to determine the 3D relative position/orientation between a robot and a measured object is known in itself. In the illustrated embodiment, when, in relation to, e.g., the robot 32A, three points P1, P2 and P3 arranged out of line on the surface of the measured object 56 are suitably selected and designated and the three-dimensional positions of these three points P1 to P3 are measured, the position/orientation of the triangle P1-P2-P3 created by these three points P1 to P3 expresses the 3D relative position/orientation of the object 56 with respect to the robot 32A.

In a case where using a vision sensor including the imaging section (or camera) 38 and each of the image processing sections 42A to 42C, as in the illustrated embodiment, it is possible to determine the three-dimensional position of each of the measurement points (e.g., P1 to P3) on the basis of a plurality of image data obtained through measurements executed by arranging each of the robots 32A to 32C at a plurality of different position/orientations. Alternatively, when, e.g., a three-dimensional vision sensor with a slit-light projector attached to the imaging section (or camera) 38 is used, it is possible to determine the 3D positions of each of the measurement points (e.g., P1 to P3) on the basis of a single image data obtained through measurement executed by arranging each robot 32A to 32C at a single position/orientation.

As will be understood from the above, it is possible for the robot system 30 to quickly perform an external measuring in association with a plurality of robots 32A to 32C, while lightening labor spent mainly on the reattaching work of the vision sensor (i.e., the imaging section 38 and the image processing sections 42A to 42C). As a result, according to the robot system 30, it is possible to efficiently measure errors in the 3D relative position/orientation between the individual robots 32A to 32C and the peripheral objects, so as to permit previously taught position/orientation data to be accurately corrected.

Figure 3:
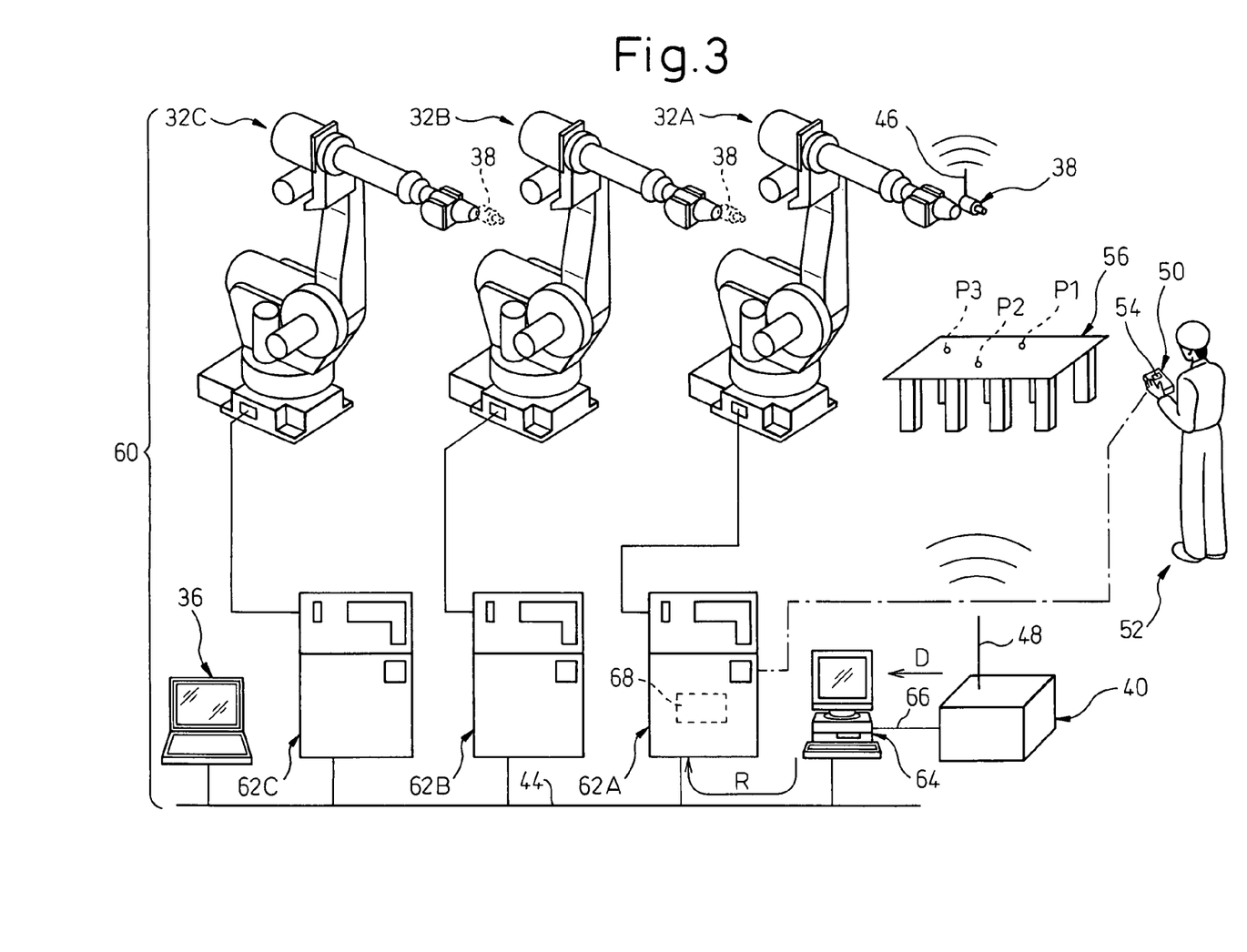
FIG. 3 is a schematic view showing a robot system according to a second embodiment of the present invention.

FIG. 3 shows the overall configuration of a robot system 60 according to a second embodiment of the present invention. The robot system 60 is provided with the basic configuration of the robot system 10 shown in FIG. 1. Also, the robot system 60 is configured to provide a single image processing unit outside a plurality of robot control units and to connect the image processing unit and the robot control units through a communication network. Except for this point, the robot system 60 has substantially the same configuration as the robot system 30 of the first embodiment, so that corresponding components are denoted by common reference numerals and the explanations thereof are not repeated.

As illustrated, the robot system 60 is provided with a plurality of (three, in the drawing) robots (or actual robot mechanical sections) 32A, 32B, 32C; a plurality of robot control units 62A, 62B, 62C provided individually corresponding to the robots 32A to 32C and controlling the operations of the individual robots 32A to 32C; and a robot simulator 36 for preparing the work programs of the robots 32A to 32C in an off-line manner and executing simulations. Further, the robot system 60 is provided with, as components of an external measuring system using a vision sensor, an imaging section (or camera) 38, a transceiver 40, and an image processing unit 64 in which an image processing section 18 (FIG. 1) is incorporated.

Each of the robot control units 62A to 62C includes a robot controlling section 14 (FIG. 1) and a vision controlling section 20 (FIG. 1), which are incorporated into a common robot control unit. The robot control units 62A to 62C are individually connected to a communication network 44 and are connected through the communication network 44 to the robot simulator 36, the transceiver 40 and the image processing unit 64 (or the image processing section 18). The robot controlling section 14 (FIG. 1) and the vision controlling section 20 (FIG. 1) can be constituted by a central processing unit (CPU) of each of the robot control units 62A to 62C. On the other hand, the image processing unit 64 can be constituted from, e.g., a personal computer into which a predetermined software is loaded.

The imaging section (or camera) 38 is detachably attached to an arm, or a work tool (i.e., an end effector) supported at the front end of the arm, of the desired robot (the robot 32A, in the drawing) selected from the robots 32A to 32C. The imaging section (or camera) 38 is provided with a data transmitting section and a data receiving section (a transmission/reception antenna 46 is illustrated). On the other hand, the transceiver 40 functions as a data transmitting and receiving section (a transmission/reception antenna 48 is illustrated) connected through a signal line 66 to the image processing unit 64 (or the image processing section 18). Therefore, the imaging section (or camera) 38 and the transceiver 40 can transmit signals to each other by a wireless or radio transmission system. The vision controlling sections 20 (FIG. 1) of each robot control units 62A to 62C (FIG. 1) causes the transmission of the image data D obtained in the imaging section 38 from the data transmitting section of the imaging section 38 to the transceiver (or the data receiving section) 40 in a form of a radio transmission as well as from the transceiver 40 through the signal line 66 to the image processing unit 64 (or the image processing section 18).

The robot system 60 is further provided with a portable-type manual operating section 50 able to be used in common for the plurality of robot control units 62A to 62C. The manual operating section 50 is connected to the robot controlling section 14 (FIG. 1) of the selected one of the robot control units 62A to 62C (the robot control unit 62A, in the drawing). When the operator 52 operates the manual operating section 50, operation commands are given to the robot control unit (the robot control unit 62A, in the drawing) connected to the manual operating section 50, and thus the robot controlling section 14 (FIG. 1) controls the operation of the corresponding robot (the robot 32A, in the drawing). Further, when operating the manual operating section 50, the robot control unit (the robot control unit 62A, in the drawing) connected to the manual operating section 50 is given commands for making the corresponding imaging section 38 and image processing unit 64 perform an image pick-up operation and a subsequent image-data transmission, and, through the robot controlling section 14, the vision controlling section 20 (FIG. 1) controls the imaging section 38 and the image processing unit 64.

In the robot system 60 having the above configuration, the single imaging section (or camera) 38 is successively attached to the robots 32A to 32C for use, while the single image processing unit 64 (or the image processing section 18) is connected through the communication network 44 to the respective robot control units 62A to 62C. Therefore, the reattaching work of the image processing unit (i.e., a cable detaching and attaching work) required in the prior art becomes unnecessary. Further, the operation control signals and image data signals of the imaging section (or camera) 38 are transmitted by the wireless or radio transmission system through the transceiver 40, so that a cable detaching and attaching work accompanying the reattachment of the imaging section (or camera) 38 also becomes unnecessary.

In the robot system 60 having the above configuration, in accordance with the procedure similar to the procedure in the robot system 30 of the first embodiment, the 3D relative position/orientations between the respective robots 32A to 32C and the corresponding objects to be measured (e.g., the robot 32A and the object 56) are measured in the image processing section 18 (FIG. 1) of the image processing unit 64. Further, the measurement results R of the 3D relative position/orientation obtained in the image processing unit 64 are passed through the communication network 44 to be stored in the memories of the corresponding robot control units 34A to 34C. The stored measurement data of the 3D relative position/orientation can be used for correcting taught point data in a robot program for an operation with respect to the same object, in a manner as described in the first embodiment.

As will be understood from the above, it is also possible for the robot system 60 to quickly perform an external measuring in association with a plurality of robots 32A to 32C, while lightening labor spent mainly on the reattaching work of the vision sensor (i.e., the imaging section 38 and the image processing unit 64). As a result, according to the robot system 60, it is possible to efficiently measure errors in the 3D relative position/orientation between the individual robots 32A to 32C and the peripheral objects, so as to permit previously taught position/orientation data to be accurately corrected.

Figure 4:
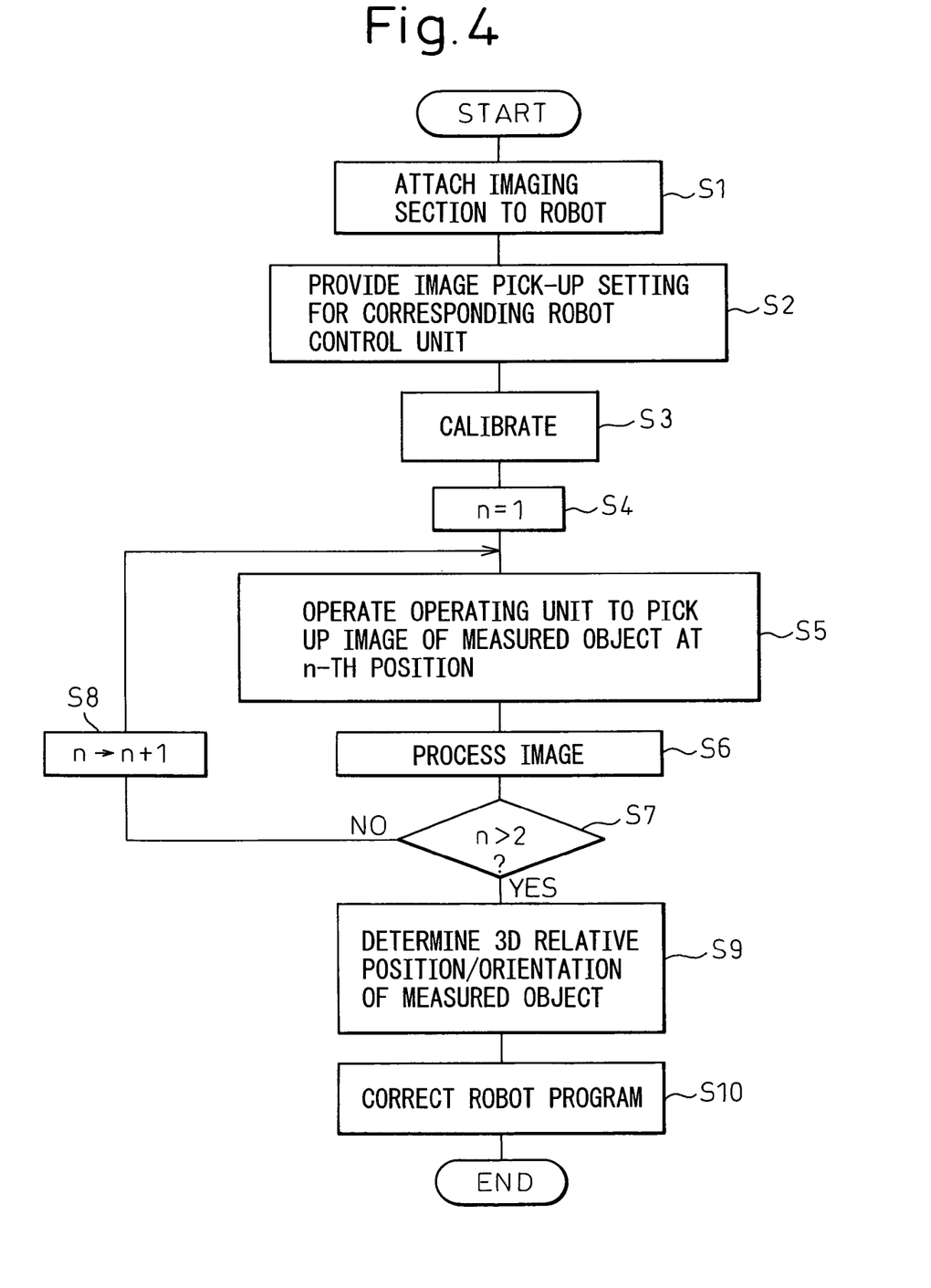
FIG. 4 is a flow chart generally showing a routine for a process of measuring a relative position error, executed in the robot system of FIG. 2 or 3.

FIG. 4 is a flow chart generally showing a routine for processing for measurement and correction of a relative position error, executed in each of the robot systems 30, 60 according to the first and second embodiments. The main points of the respective steps are explained below.

Step S1: In accordance with the priority order of measurement, etc., the imaging section (or camera) 38 is attached to a robot optionally selected from the plurality of robots 32A to 32C. For example, in a case where the object 56 is initially measured, the imaging section (or camera) 38 is attached to the arm distal end of the robot 32A (or to the work tool supported at the arm distal end).

Step S2: Various settings for receiving the image data are loaded into the corresponding robot control unit. For example, in a case where the object 56 is initially measured, the robot control unit 34A (first embodiment) or 62A (second embodiment) is subjected to the settings for receiving the image data. The settings may be input by a screen operation in the display section 54 of the manual operating section 50.

Step S3: Calibration is performed for determining a relative position between the robot and the imaging section (or camera) 38. The explanation of the procedure for this calibration will be omitted.

Step S4: An index "n" expressing the number of times of robot positioning operation required for measurement is initialized as "n=1".

Step S5: The robot is moved while monitoring a captured image on the screen of the manual operating section 50, is positioned at a suitable location, and picks up the image of the object to be measured. For example, the image data of the measured object 56 is received wirelessly at the transceiver 40 and input to the robot control unit 34A (first embodiment) or the image processing unit 64 (second embodiment).

Step S6: The image processing is performed in one of the image processing sections 42A to 42C of the robot control unit 34A to 34C (first embodiment) or the image processing section 18 of the image processing unit 64 (second embodiment). In the image processing, for example, points P1 to P3 are extracted to determine the positions thereof in the image.

Step S7: It is judged whether "n>2". If "n>2", the routine proceeds to step S9. If "n" is not greater than 2, the routine proceeds to step S8.

Step S8: The index "n" is increased by 1, and then the routine returns to step S5.

Step S9: The three dimensional positions of three points of the measured object (e.g., the points P1 to P3 of the measured object 56) are determined, and the 3D relative position/orientation of the measured object with respect to the robot is calculated.

Step S10: Based on the 3D relative position/orientation determined by calculation, taught point data in a program prepared by an off-line teaching (which is transferred in advance from the robot simulator 36 to the respective robot control units) is corrected.

Through the above steps S1 to S10, the measuring and correcting process of the relative position errors is completed with regard to one set of the robot and object to be measured (e.g., the set of the robot 32A and the object 56). Therefore, if there is another set requiring the measurement, the imaging section (or camera) 38 is reattached to a robot of the next set, as explained above, and steps S1 to S10 of the processing flow are executed.

In this way, it is possible to measure a 3D relative position/orientation between the actual robot and the measured object, determine the error between the measured 3D relative position/orientation and a 3D relative position/orientation used in an off-line teaching or a 3D relative position/orientation before displacement in a case where the robot system is displaced, and thereby correct the actual taught program. Further, it is possible to correct various parameters at the time of simulation by using the measurement data of the 3D relative position/orientation between the actual robot and the measured object, and thereby execute a more accurate off-line teaching and simulation as well as an off-line teaching and simulation for other operations.

Each of the robot control units 34A to 34C or the robot control units 62A to 62C of the robot system 30, 60 according to the first or second embodiment can be described as to be provided with the robot controlling section 14 for controlling the operation of each robot 32A to 32C in accordance with a work program, and a command value correcting section 68 (see FIG. 3) for correcting a position-related command value included in the work program, based on robot-position related data obtained as a result of processing the image data D in each image processing section 42A to 42C or image processing unit 64. Note that each image processing section 42A to 42C or image processing unit 64 used for measurement in the above embodiments does not require a high speed processing capability. Therefore, as described in the first embodiment, it is possible to easily incorporate each image processing section 42A to 42C into each robot control unit 34A to 34C.

While the invention has been described with reference to specific preferred embodiments, it will be understood by those skilled in the art that various changes and modifications may be made thereto without departing from the scope of the following claims.

The invention claimed is:

1. A robot system comprising:
a plurality of robots;
a plurality of robot control units provided to individually correspond to said plurality of robots, each of said plurality of robot control units including a robot controlling section for controlling an operation of each of said plurality of robots;
a single imaging section detachably attached to a desired robot selected from said plurality of robots and obtaining image data of a working environment of said desired robot, said single imaging section able to be successively attached to said plurality of robots;
an image processing section for processing said image data obtained in said imaging section;
a vision controlling section for controlling said single imaging section and said image processing section to cause execution of obtaining said image data, transmitting said image data thus obtained, and processing said image data, said vision controlling section being included in each of said plurality of robot control units;
a communication network to which said plurality of robot control units, each including said robot controlling section and said vision controlling section, and said image processing section are connected;
a data transmitting section provided in said imaging section; and
a data receiving section including a transceiver connected to said image processing section through said communication network;
wherein said image processing section is included in each of said plurality of robot control units;
wherein said single imaging section is able to be connected to said image processing section of each of said plurality of robot control units through said communication network to enable a data communication; and
wherein said vision controlling section causes a transmission of said image data obtained in said single imaging section from said data transmitting section to said transceiver in a form of a radio transmission, and causes a transmission of said image data from said transceiver to said image processing section of each of said plurality of robot control units through said communication network.

2. A robot system as set forth in claim 1, further comprising a manual operating section connected to said robot controlling section; wherein, by an operation for said manual operating section, said robot controlling section controls said operation of said robot, and said vision controlling section controls said imaging section and said image processing section through said robot controlling section.

3. A robot system as set forth in claim 2, wherein said manual operating section is provided with a display section; and wherein said vision controlling section makes said display section display, as an image, said image data obtained in said imaging section, by an operation for said manual operating section.

4. A robot system as set forth in claim 3, wherein said vision controlling section makes said imaging section obtain said image data at predetermined time intervals and makes said display section display, as a moving image, said image data thus obtained.

5. A robot system as set forth in claim 2, wherein said robot controlling section and said vision controlling section are incorporated into a common robot control unit.

6. A robot control unit incorporated into a robot system as set forth in claim 1, comprising:
   said robot controlling section for controlling said operation of said robot in accordance with a work program; and
   a command value correcting section for correcting a position-related command value included in said work program, based on robot-position related data obtained as a result of processing of said image data in said image processing section.

7. A robot system comprising:
   a plurality of robots:,
   a plurality of robot control units provided to individually correspond to said plurality of robots, each of said plurality of robot control units including a robot controlling section for controlling an operation of each of said plurality of robots;
   a single imaging section detachably attached to a desired robot selected from said plurality of robots and obtaining image data of a working environment of said desired robot, said single imaging section able to be successively attached to said plurality of robots;
   a single image processing section for processing said image data obtained in said single imaging section;
   a vision controlling section for controlling said single imaging section and said image processing section to cause execution of obtaining said image data, transmitting said image data thus obtained, and processing said image data, said vision controlling section being included in each of said plurality of robot control units;
   a communication network to which said plurality or robot control units, each including said robot controlling section and said vision controlling section, and said single image processing section are connected;
   a data transmitting section provided in said single imaging section; and
   a data receiving section including a transceiver connected to said image processing section through a single line;
   wherein said single imaging section is able to be connected to said single image processing section through said signal line to enable a data communication;
   wherein said vision controlling section of each of said plurality of robot control units is connected to said single image processing section through said communication network; and
   wherein said vision controlling section causes a transmission of said image data obtained in said single imaging section from said data transmitting section to said transceiver in a form of a radio transmission, and causes a transmission of said image data from said transceiver to said single image processing section through said signal line.

* * * * *